(12) United States Patent
Fink

(10) Patent No.: US 10,562,474 B2
(45) Date of Patent: *Feb. 18, 2020

(54) VEHICLE ELECTRICAL SYSTEM

(71) Applicants: Robert Bosch GmbH, Stuttgart (DE); Samsung SDI Co., Ltd., Yongin-si, Gyeonggi-do (KR)

(72) Inventor: Holger Fink, Stuttgart (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 260 days.

This patent is subject to a terminal disclaimer.

(21) Appl. No.: 15/114,508

(22) PCT Filed: Jan. 23, 2015

(86) PCT No.: PCT/EP2015/051349
§ 371 (c)(1),
(2) Date: Jul. 27, 2016

(87) PCT Pub. No.: WO2015/110576
PCT Pub. Date: Jul. 30, 2015

(65) Prior Publication Data
US 2016/0339858 A1      Nov. 24, 2016

(30) Foreign Application Priority Data

Jan. 27, 2014   (DE) .................. 10 2014 201 346

(51) Int. Cl.
*B60L 1/00*     (2006.01)
*B60L 3/00*     (2019.01)
(Continued)

(52) U.S. Cl.
CPC .............. *B60R 16/033* (2013.01); *H02J 1/08* (2013.01); *H02M 3/04* (2013.01); *H02J 7/0024* (2013.01);
(Continued)

(58) Field of Classification Search
CPC ..... B60R 16/033; H02J 1/08; H02J 2001/008; H02J 7/0024; H02M 3/04; Y02T 10/7055
(Continued)

(56) References Cited

U.S. PATENT DOCUMENTS 6,281,662 B1 *   8/2001   Flohr ................ H02J 7/0054
                                                       320/139
2008/0072859 A1 *   3/2008   Esaka ............... H02J 7/0019
                                                       123/179.3
(Continued)

FOREIGN PATENT DOCUMENTS

CN    105934867 A    9/2016
DE    100 57 259 A1  5/2002
(Continued)

OTHER PUBLICATIONS

International Search Report corresponding to PCT Application No. PCT/EP2015/051349, dated Apr. 2, 2015 (German and English language document) (7 pages).

*Primary Examiner* — Rexford N Barnie
*Assistant Examiner* — Toan T Vu
(74) *Attorney, Agent, or Firm* — Maginot, Moore & Beck LLP

(57) ABSTRACT

The disclosure relates to a vehicle electrical system for a motor vehicle. The vehicle electrical system comprises: a low-voltage sub-system for at least one low-voltage load; a high-voltage sub-system for at least one high-voltage load; and a starter/generator; wherein the high-voltage sub-system is connected to the low-voltage sub-system by means of a
(Continued)

coupling unit designed to draw energy from the high-voltage sub-system and to feed said energy to the low-voltage sub-system, wherein the high-voltage sub-system has a battery, which is designed to produce the high voltage and to output the high voltage to the high-voltage sub-system and which has at least two battery units having individual voltage taps, which are led to the coupling unit. The coupling unit is designed to selectively connect the battery units to the low-voltage sub-system. The disclosure further relates to a motor vehicle, comprising an internal combustion engine and such a vehicle electrical system.

14 Claims, 5 Drawing Sheets

(51) Int. Cl.
  *H02G 3/00* (2006.01)
  *B60R 16/033* (2006.01)
  *H02J 1/08* (2006.01)
  *H02M 3/04* (2006.01)
  *H02J 1/00* (2006.01)
  *H02J 7/00* (2006.01)

(52) U.S. Cl.
  CPC ..... *H02J 2001/008* (2013.01); *Y02T 10/7055* (2013.01)

(58) Field of Classification Search
  USPC .......................... 307/10.1, 9.1; 320/108, 109
  See application file for complete search history.

(56) References Cited

U.S. PATENT DOCUMENTS

| | | | | |
|---|---|---|---|---|
| 2013/0106320 | A1* | 5/2013 | Yugo | H02P 7/00 318/139 |
| 2014/0183939 | A1* | 7/2014 | Jiang | B60L 11/1853 307/9.1 |
| 2016/0049813 | A1* | 2/2016 | Takizawa | H01M 10/441 320/112 |

FOREIGN PATENT DOCUMENTS

| | | |
|---|---|---|
| DE | 10 2005 038 746 A1 | 3/2007 |
| DE | 10 2008 002 177 A1 | 12/2009 |
| DE | 10 2008 037 064 A1 | 2/2010 |
| DE | 10 2009 028 147 A1 | 2/2011 |
| DE | 10 2009 046 553 A1 | 5/2011 |
| DE | 10 2010 014 104 A1 | 10/2011 |
| DE | 10 2012 010 711 A1 | 3/2013 |
| DE | 10 2012 003 309 A1 | 8/2013 |
| JP | 2008-109749 A | 5/2008 |
| WO | 01/37393 A1 | 5/2001 |
| WO | WO 01/37393 * | 5/2001 |

* cited by examiner

VEHICLE ELECTRICAL SYSTEM

This application is a 35 U.S.C. § 371 National Stage Application of PCT/EP2015/051349, filed on Jan. 23, 2015, which claims the benefit of priority to Serial No. DE 10 2014 201 346.1, filed on Jan. 27, 2014 in Germany, the disclosures of which are incorporated herein by reference in their entirety.

BACKGROUND

The disclosure relates to an onboard electrical system for a motor vehicle, and to a motor vehicle having such an onboard electrical system.

In motor vehicles having an internal combustion engine, an onboard electrical system that is operated at 12 V as standard is provided for supplying power to the electric starter for the internal combustion engine and to further electrical apparatuses of the motor vehicle. When starting the internal combustion engine, the onboard electrical system is used to provide a voltage from a starter battery for a starter that starts the internal combustion engine when a switch is closed, for example by an appropriate starter signal. Once the internal combustion engine has been started, it drives an electrical generator that then produces a voltage of approximately 12 V and provides it for the various electrical loads in the vehicle via the onboard electrical system. In so doing, the electrical generator also recharges the starter battery loaded by the starting process. When the battery is charged via the onboard electrical system, the actual voltage may also be above the rated voltage, e.g. at 14 V or at 14.4 V. The onboard electrical system at a voltage of 12 V or 14 V is also referred to as a low voltage onboard electrical system within the context of the present disclosure.

It is known practice to use a further onboard electrical system having a rated voltage of 48 V in electric and hybrid vehicles, said system also being referred to as a high voltage onboard electrical system within the context of the disclosure.

SUMMARY

The disclosure provides an onboard electrical system for a motor vehicle, wherein the onboard electrical system has a low voltage subsystem for at least one low voltage load and a high voltage subsystem for at least one high voltage load and a starter generator, wherein the high voltage subsystem is connected to the low voltage subsystem by means of a coupling unit that is set up to draw power from the high voltage subsystem and to supply it to the low voltage subsystem, wherein the high voltage subsystem has a battery that is set up to produce the high voltage and to output it to the high voltage subsystem, and that has at least two battery units having individual voltage taps that are routed to the coupling unit, wherein the coupling unit is set up to selectively connect the battery units to the low voltage subsystem.

The disclosure has the advantage that the low voltage subsystem can operate electrical loads that are designed for a low first voltage, and high performance loads have the high voltage subsystem available, i.e. the onboard electrical subsystem having a voltage that is increased in comparison with the first voltage. The supply of power to the low voltage subsystem is overlaid on the charging and discharge processes in the high voltage subsystem. The supply of power to the low voltage subsystem via the high voltage subsystem takes place unidirectionally in this case, i.e. the coupling unit provides the transfer of power preferably only in one direction.

The onboard electrical system can be used both for static applications, e.g. for wind power installations, and in vehicles, e.g. in hybrid and electric vehicles. In particular, the onboard electrical system can be used for vehicles that have start/stop systems.

The presented system, i.e. the onboard electrical system and an associated controller, for example a battery management system, is particularly suitable for use in vehicles that have a 48 volt generator and a 14 volt starter, the 14 volt starter preferably being designed for start/stop systems.

The presented system is particularly suitable for use in vehicles that have what is known as a boost recuperation system (BRS). In boost recuperation systems (BRS), electric power is obtained during braking processes, during descents or when coasting so as thereby to supply power to the electrical loads. The BRS increases the efficiency of the system, which means that fuel can be saved and emissions can be reduced. The battery in the high voltage subsystem can support the internal combustion engine in this case, this being referred to as what is known as boost, or can even be used for purely electric driving for short distances at low speeds, e.g. in the case of electric parking and exit from a parking space.

In the present description, the terms "battery" and "battery unit" are used for storage battery or storage battery unit, in a manner adjusted to customary usage. The battery comprises one or more battery units, which can denote a battery cell, a battery module, a module string or a battery pack. In this case, the battery cells are preferably spatially combined and connected to one another in terms of circuitry, for example interconnected serially or in parallel to form modules. Multiple modules can form what are known as battery direct converters (BDCs) and multiple battery direct converters can form a battery direct inverter (BDI).

Advantageous developments and improvements in the subject specified in the disclosure are possible by virtue of the measures described herein.

It is thus advantageous if the selectively connectable battery units are each designed to provide the low voltage. The battery units can thus be used alternately to provide the low voltage, e.g. in order to support a start/stop system, which results in an increased life for the battery unit.

According to one preferred embodiment, the coupling unit has at least one switch with reverse blocking capability. Preferably, the switches with reverse blocking capability are suitable for connecting and disconnecting a selectively connectable battery unit to/from the low voltage subsystem. These switches have the property that they allow a flow of current only in one direction in the "on" state and can accept a blocking voltage having both polarities in the "off" state.

When a battery unit is connected to the low voltage subsystem, preferably at least one switch with reverse blocking capability, particularly preferably two switches with reverse blocking capability, is/are operated. When a battery unit is disconnected from the low voltage subsystem, likewise preferably at least one switch with reverse blocking capability, particularly preferably two switches with reverse blocking capability, is/are operated.

According to one preferred embodiment, the coupling unit has at least one switch with forward blocking capability. Preferably, the switches with forward blocking capability are suitable for series connection of the selectively connectable battery units. Preferably, provision is made for breakage of the line between two battery units to prompt at least one switch with forward blocking capability to be operated. Similarly, provision is preferably made for connection of the line between the battery units to prompt at least one switch with forward blocking capability to be operated.

According to one preferred embodiment, the coupling unit is set up to connect at least two battery units in parallel with one another for the low voltage subsystem. This allows greatly differing states of charge of the two battery units to prompt the low voltage subsystem to be supplied with power from that battery unit that has the higher state of charge or provides the higher voltage. When the states of charge of the battery units are the same or similar, the low voltage subsystem is supplied with power from both battery units.

According to one preferred embodiment, the coupling unit is set up to connect at least two battery units in series, i.e. to one another in series, for the high voltage subsystem.

Additionally, provision may be made for the low voltage subsystem to have at least one capacitor. The capacitor is preferably set up to further stabilize the low voltage when the connected battery unit changes. The capacitor is furthermore preferably also suitable as an energy store that is set up to produce the low voltage and to output it to the low voltage subsystem, at least in the short term.

The voltage dip in the low voltage subsystem can additionally advantageously be decreased if changeover is effected at times at which the onboard electrical system current is as small as possible. This can be accomplished by evaluating a signal for the onboard electrical system current and actuating the switches of the coupling unit on the basis thereof, for example. Furthermore, synchronization to a load management system can also be effected in order to disconnect high performance loads, such as e.g. heating systems, temporarily without losses of comfort in order to allow the changeover process for the battery units without a significant voltage dip.

Preferably, the onboard electrical system has a controller for controlling the coupling unit for the purpose of connecting the battery units. By way of example, the controller may be associated with a battery management system that is associated with the battery and that comprises further units, for example, that are set up to record measurement data about temperatures, voltages provided, currents output and states of charge of the battery or of the battery units, to process them and to make statements about the state of health of the battery, for example, therefrom. The controller for controlling the coupling unit can have a computer program that may be stored on a machine-readable storage medium, for example on a permanent or rewritable storage medium, or in association with a computer device, for example on a portable memory, such as a CD-ROM, DVD, Blue-ray disc, a USB stick or a memory card. Additionally and alternatively, the computer program can be provided on a computer device, such as on a server or a cloud server, for example, for download, for example via a data network, such as the Internet, or a communication link, such as a telephone line or a wireless connection, for example.

According to the disclosure, a motor vehicle is further specified, having an internal combustion engine and an onboard electrical system as described above.

The disclosure provides an inexpensive onboard electrical system having a lithium ion battery system for vehicles that has a high voltage subsystem, a low voltage subsystem and a boost recuperation system with unidirectional supply of power to the low voltage subsystem. In this case, a potential-isolating DC/DC converter, and also the lead acid battery, can be dispensed with in comparison with known systems. Furthermore, there is no need for a separate starter in the low voltage subsystem. The system is therefore distinguished by a reduced volume and by a lower weight in comparison with boost recuperation systems that are currently under development. Given suitable design, the boost recuperation system can furthermore save much more energy in comparison with boost recuperation systems that are currently under development, and can thereby recover more electric power in the system during longer braking processes or descents.

BRIEF DESCRIPTION OF THE DRAWINGS

Exemplary embodiments of the disclosure are presented in the drawings and explained in more detail in the description below. In the drawings

DETAILED DESCRIPTION

Figure 1:
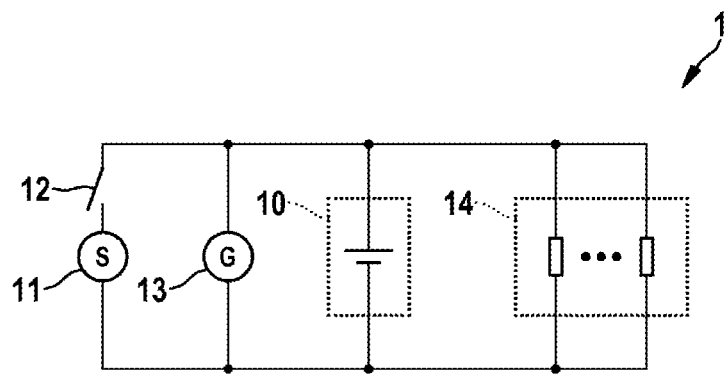
FIG. 1 shows a low voltage onboard electrical system according to the prior art.

FIG. 1 shows an onboard electrical system 1 according to the prior art. When starting an internal combustion engine, the onboard electrical system 1 is used to provide a voltage from a starter battery 10 for a starter 11 that starts the internal combustion engine (not shown) when a switch 12 is closed, for example by an appropriate starter signal. Once the internal combustion engine has been started, it drives an electrical generator 13 that then produces a voltage of approximately 12 volts and provides it for the various electrical loads 14 in the vehicle via the onboard electrical system 1. In so doing, the electrical generator 13 also recharges the starter battery 10 loaded by the starting process.

Figure 2:
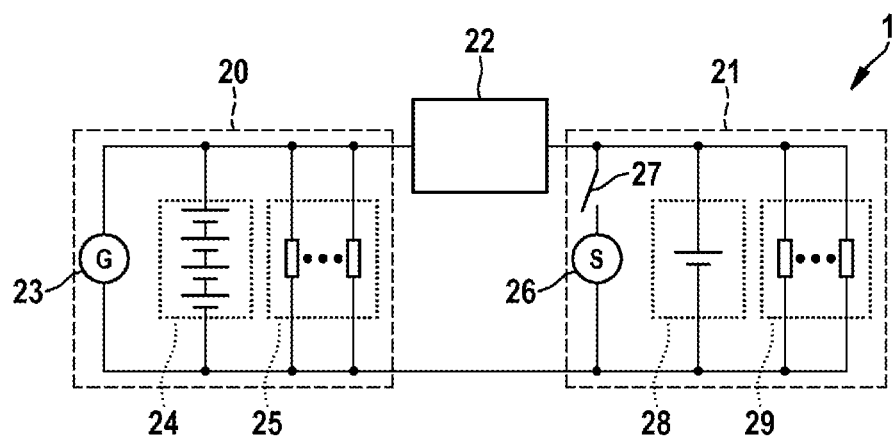
FIG. 2 shows an onboard electrical system with a high voltage subsystem and a low voltage subsystem and a unidirectional, potential-isolating DC/DC converter.

FIG. 2 shows an onboard electrical system 1 with a high voltage subsystem 20 and a low voltage subsystem 21 and a unidirectional, potential-isolating DC/DC converter 22 that forms a coupling unit between the high voltage subsystem 20 and the low voltage subsystem 21. The onboard electrical system 1 may be an onboard electrical system of a vehicle, particularly a motor vehicle, transport vehicle or forklift truck.

By way of example, the high voltage subsystem 20 is, for example, a 48 volt onboard electrical system having an electrical generator 23 that can be operated by an internal combustion engine (not shown). In this exemplary embodiment, the generator 23 is designed to take a rotary movement of the engine of the vehicle as a basis for producing an electric power and supplying it to the high voltage subsystem 20. The high voltage subsystem 20 additionally comprises a battery 24 that may be in the form of a lithium ion battery, for example, and that is set up to output the necessary operating voltage to the high voltage subsystem. The high voltage subsystem 20 contains further load resistors 25 that may be formed by at least one, preferably by a plurality of, electrical load(s) of the motor vehicle, for example, that are operated at the high voltage.

The low voltage subsystem 21, which is arranged on the output side of the DC/DC converter 22, contains a starter 26 that is set up to close a switch 27 in order to start the internal combustion engine, and an energy store 28 that is set up to provide the low voltage at the level of 12 V or 14 V, for example, for the low voltage subsystem 21. The low voltage subsystem 21 contains further loads that are operated at the low voltage. By way of example, the energy store 28 comprises electrochemical cells, particularly those of a lead acid battery, which usually has a voltage of 12.8 volts in the fully charged state (state of charge, SOC=100%). When the battery is discharged (state of charge, SOC=0%), the energy store 28 has a terminal voltage of typically 10.8 volts in the unloaded state. During driving mode, the onboard electrical system voltage in the low voltage subsystem 21 is approximately in a range between 10.8 volts and 15 volts, depending on the temperature and the state of charge of the energy store 28.

The input side of the DC/DC converter 22 is connected to the high voltage subsystem 20 and to the generator 23. The output side of the DC/DC converter 22 is connected to the low voltage subsystem 21. The DC/DC converter 22 is designed to receive a DC voltage received on the input side, for example a DC voltage at which the high voltage subsystem is operated, for example between 12 and 48 volts, and to produce an output voltage that is different than the voltage received on the input side, particularly to produce an output voltage that is lower than the voltage received on the input side, for example 12 V or 14 V.

Figure 3:
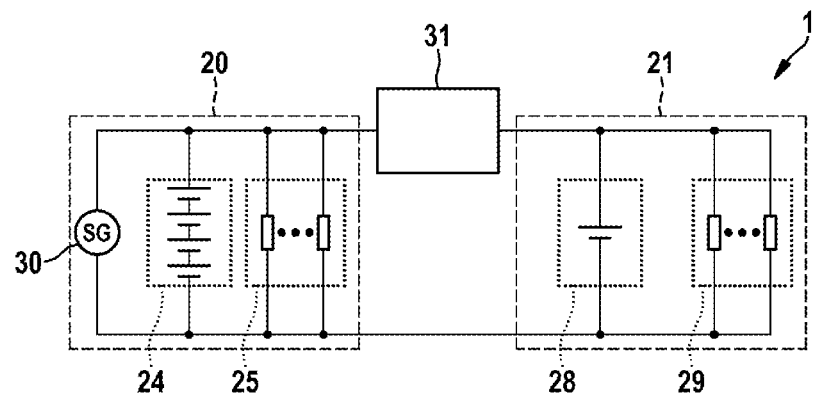
FIG. 3 shows an onboard electrical system with a high voltage subsystem and a low voltage subsystem and a bidirectional, potential-isolating DC/DC converter.

FIG. 3 shows an onboard electrical system 1 with a high voltage subsystem 20 and a low voltage subsystem 21 that are connected by a bidirectional, potential-isolating DC/DC converter 31. The onboard electrical system 1 shown is essentially designed in the manner of the onboard electrical system shown in FIG. 2, wherein the generator is incorporated in the high voltage subsystem and a DC/DC converter 31, which is of potential-isolating design, is used for transferring power between the onboard electrical subsystems 20, 21. Both subsystems 20, 21 furthermore contain batteries 24, 28 and loads 25, 29, as described with reference to FIG. 2. Essentially, the system shown in FIG. 3 is distinguished by virtue of the incorporation of the starter. While the starter 26 is arranged in the low voltage subsystem 21 in the system shown in FIG. 2, and, as a result, the DC/DC converter 22 may be of unidirectional design for transporting power from the high voltage subsystem 20 to the low voltage subsystem 21, a starter generator 30 is used in the high voltage subsystem 20 in the case of the architecture shown in FIG. 3. In this case, the DC/DC converter 31 is of bidirectional design, so that the lithium ion battery 24 can be charged via the low voltage subsystem if need be. The starting assistance for the low voltage vehicle is then provided by means of the low voltage interface and the DC/DC converter 31.

Figure 4:
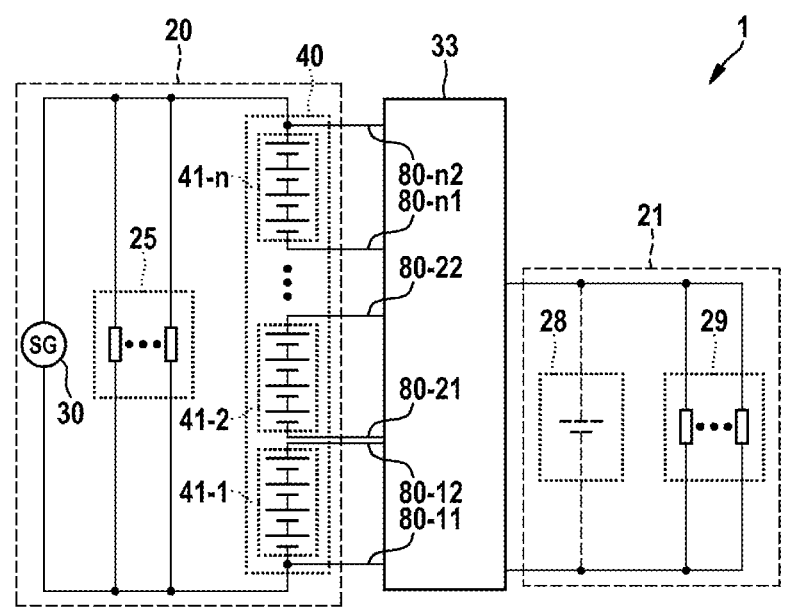
FIG. 4 shows an onboard electrical system with a high voltage subsystem and a low voltage subsystem and a unidirectional, non-isolating DC/DC converter.

FIG. 4 shows an onboard electrical system 1 with a high voltage subsystem 20 and a low voltage subsystem 21, for example an onboard electrical system 1 of a vehicle, particularly of a motor vehicle, a transport vehicle or forklift truck. The onboard electrical system 1 is particularly suitable for use in vehicles with a 48 volt generator, a 14 volt starter and a boost recuperation system.

The high voltage subsystem 20 comprises a starting generator 30 that can start an internal combustion engine (not shown) and can be operated by the latter. The starting generator 30 is designed to take a rotary movement of the engine of the vehicle as a basis for producing electric power and supplying it to the high voltage subsystem 20. The high voltage subsystem 20 contains further load resistors 25 that may be formed by at least one, preferably by a plurality of, electrical load(s) of the motor vehicle, for example, that are operated at the high voltage.

The high voltage subsystem 20 furthermore comprises a battery 40 that may be in the form of a lithium ion battery, for example, and that is set up to output the operating voltage of 48 volts to the high voltage subsystem. At a rated voltage of 48 volts, the lithium ion battery 40 preferably has a minimum capacity of approximately 15 Ah in order to be able to store the required electric power.

The battery 40 has multiple battery units 41-1, 41-2, ..., 41-n, wherein the battery units 41 have multiple associated battery cells that are usually connected in series and in some cases are additionally connected in parallel with one another in order to obtain the requisite performance and power data with the battery 40. The individual battery cells are lithium ion batteries with a voltage range from 2.8 to 4.2 volts, for example.

The battery units 41-1, 41-2, ..., 41-n have associated individual voltage taps 80-11, 80-12, 80-21, 80-22, ..., 80-n1, 80-n2 via which the voltage is supplied to a coupling unit 33. The coupling unit 33 has the task of connecting at least one of the battery units 41 of the battery 40 to the low voltage subsystem 21 for the purpose of operating or supporting the latter, and of interconnecting said battery units in a suitable manner for the high voltage subsystem 20.

The coupling unit 33 couples the high voltage subsystem 20 to the low voltage subsystem 21 and, on the output side, provides the low voltage subsystem 21 with the necessary operating voltage, for example 12 V or 14 V. The design and operation of the coupling unit 33 are described with reference to FIGS. 5 to 7.

The low voltage subsystem 21 comprises the low voltage loads 29, which are designed for operation at 14 V voltage, for example. According to one embodiment, provision is made for the lithium ion battery 40 to undertake the supply of power to quiescent current loads, which are shown as loads 25, 29, when the vehicle is switched off. By way of example, provision may be made for the requirements of what is known as the airport test to be met in this case, wherein the vehicle can still be started after a standing time of six weeks and wherein, during the standing time, the battery provides the quiescent currents for the low voltage loads 29 in the low voltage subsystem 21 so that a theft warning system is supplied with the power, for example.

The low voltage subsystem 21 optionally contains a high performance store 28 or buffer store that can temporarily output very high power, i.e. is optimized for high performance. The high performance store 28 achieves the aim of further avoiding overvoltages when the battery units 41 are changed over. If a capacitor is used as the high performance store 28, then the dimensioning of said capacitor is preferably:

$$C = \frac{I_{max} \cdot t_{changeover}}{\Delta U_{max}},$$

where $I_{max}$ is the maximum onboard electrical system current that can flow in the onboard electrical system during the changeover processes, $t_{changeover}$ is the period of time during which no battery unit 41 is available for the supply of power, and $\Delta U_{max}$ is the maximum permissible change in the onboard electrical system voltage during the changeover process.

Figure 5:
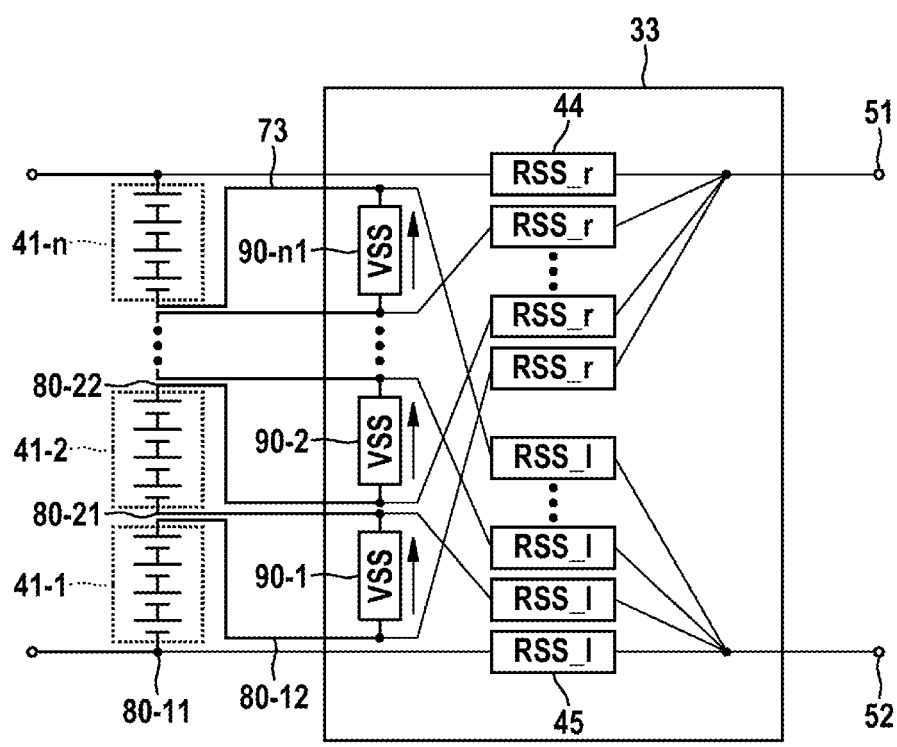
FIG. 5 shows a coupling unit in an exemplary operating state.

FIG. 5 shows a coupling unit 33 that is embodied as a unidirectional, non-isolating DC/DC voltage converter (DC/DC converter). The coupling unit 33 comprises switches with reverse blocking capability 44, 45 that have the property that they allow a flow of current only in one direction in an "on" state and can accept a blocking voltage having both polarities in a second, "off" state. This is a significant difference in relation to simple semiconductor switches, such as e.g. IGBT switches, since these cannot accept a blocking voltage in a reverse direction on account of their intrinsic diode. The dependence on the direction of current flow means that FIG. 5 shows two different switch types, namely RSS_l 45 and RSS_r 44, which need not differ in terms of their manufacture but rather are merely installed with different polarity. An example of the more detailed design of the switches with reverse blocking capability 44, 45 is described with reference to FIG. 8.

In the coupling unit 33, the individual taps 80 of the battery units 41 are each supplied to one of the different switches with reverse blocking capability RSS_l and RSS_r 44. The switches with reverse blocking capability RSS_l 45 are connected to the positive pole 52 on the output side of the coupling unit 33, and the switches with reverse blocking capability RSS_r 44 are connected to the negative pole 51 on the output side of the coupling unit 33.

The coupling unit 33 comprises switches with forward blocking capability VSS 90, which may be standard semiconductor switches, for example. An example of the more detailed design of the switches with forward blocking capability 90 is described with reference to FIG. 8. In the coupling unit 33, the individual taps of the battery units 41 are branched and supplied to a respective switch with forward blocking capability VSS 90 in parallel with the switches with reverse blocking capability. The switches with forward blocking capability VSS 90 connect the battery units 41 to one another in series when the switches 90 are closed. In this case, a switch with forward blocking capability VSS 90 is arranged between two respective battery units 41, so that n−1 switches with forward blocking capability VSS 90-1, VSS 90-2, . . . VSS 90-n−1 are provided for n battery units 41.

The reference symbol 73 is used to show the current path through the battery units 41 for supplying power to the high voltage subsystem. All of the switches with forward blocking capability 90 are closed in this case.

The voltage of the high voltage subsystem 20 referenced to the ground of the low voltage subsystem 21 is dependent on which of the battery units 41 is or are connected. In none of the operating states does one of the potentials have an absolute value that exceeds a voltage limit amounting to the sum of the high voltage and the low voltage, however, i.e. approximately 62 volts in the case of a 48 volt system and a 14 volt system. Negative potentials relative to the ground of the low voltage subsystem 21 can appear, however.

Figure 6:
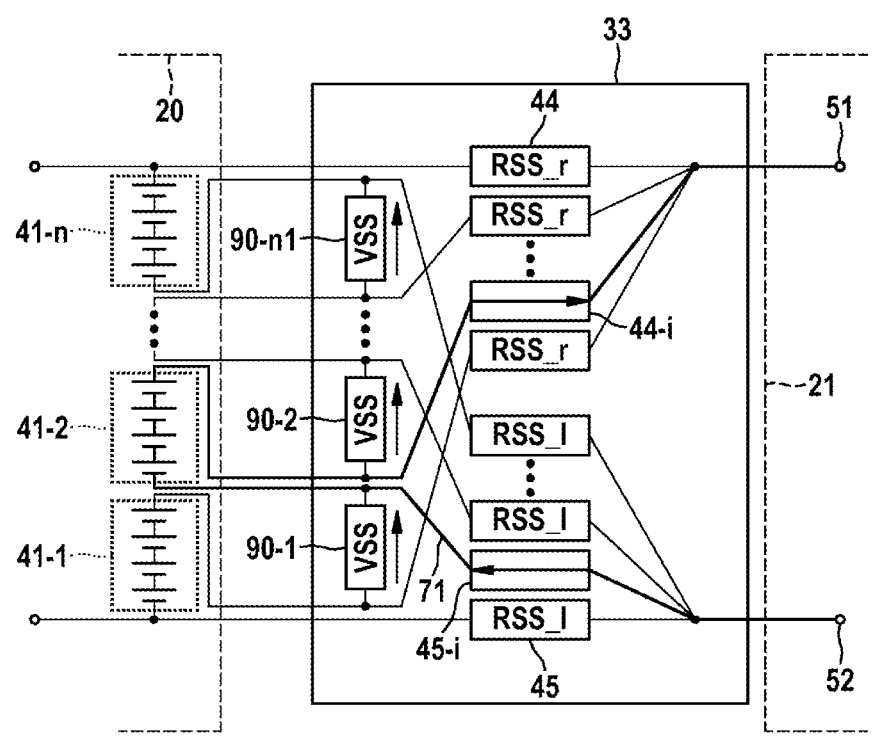
FIG. 6 shows the coupling unit from FIG. 5 in a further exemplary operating state.

FIG. 6 shows the supply of power to the low voltage subsystem 21 by way of example from the battery unit 41-2 via the switches with reverse blocking capability RSS_l 45-i, RSS_r 44-i that are switched on. In this case, a current path 71 leads from the positive pole 52 via the switch with reverse blocking capability RSS_l 45-i, via the second connected battery unit 41-2, via the further switch with reverse blocking capability RSS_r 44-i, to the negative pole 51.

The use of the switches with forward blocking capability 90 allows two or more battery elements 41 to be connected in parallel for the purposes of supplying power to the low voltage subsystem 21. In this case, the switches with forward blocking capability 90 are controlled to the "off" state. When the battery units 41 connected in parallel are at different voltage levels, the flow of power to the low voltage subsystem 21 is provided only from that battery element 41 that has the higher voltage level. The flow of power from the battery element 41 with a higher voltage to the battery element 41 with the lower voltage is prevented by switches with reverse blocking capability 44, 45, which are associated with the battery element 41 having the lower voltage. During the parallel connection of battery elements 41, the switches with forward blocking capability 90 are off and the generator ideally supplies no power to the high voltage subsystem 20.

According to one embodiment, the onboard electrical system or the control system is set up such that the battery 40 is able to supply the starter generator 30 with power only when the switches with forward blocking capability 90 are switched on. Charging the battery 40 does not necessarily require the switches with forward blocking capability 90 to be on, since the intrinsic diodes of the switches with forward blocking capability 90 are able to carry the charging current. Preferably, the switches with forward blocking capability 90 are switched on whenever no parallel operation for the supply of power to the low voltage subsystem 21 takes place, in order to reduce the power loss within the switches with forward blocking capability 90.

The operation of the starter generator 30 is independent of the operation of the coupling unit 33 and of the supply of power to the low voltage subsystem 21. In the connected battery unit 41 that supplies power to the low voltage subsystem 21, an overlay results from the low voltage subsystem current and the charging current possibly supplied to the whole battery 40 by the starter generator 30 (generator mode) or from the discharge current drawn from the whole battery 40 (engine mode). So long as the permissible limits of the battery cells, e.g. the maximum permissible discharge current from the cells, are not exceeded, these processes can be considered independently of one another. So that the low voltage subsystem 21 is safely supplied with power, at least one of the battery units 41 is always connected by means of the associated switches 44, 45, 90 of the coupling device 33. The supply of power to the low voltage subsystem 21 on the basis of multiple redundancy means that the presented architecture can be used to design a system that has a very high level of availability for the electric power in the low voltage subsystem 21.

Figure 7:
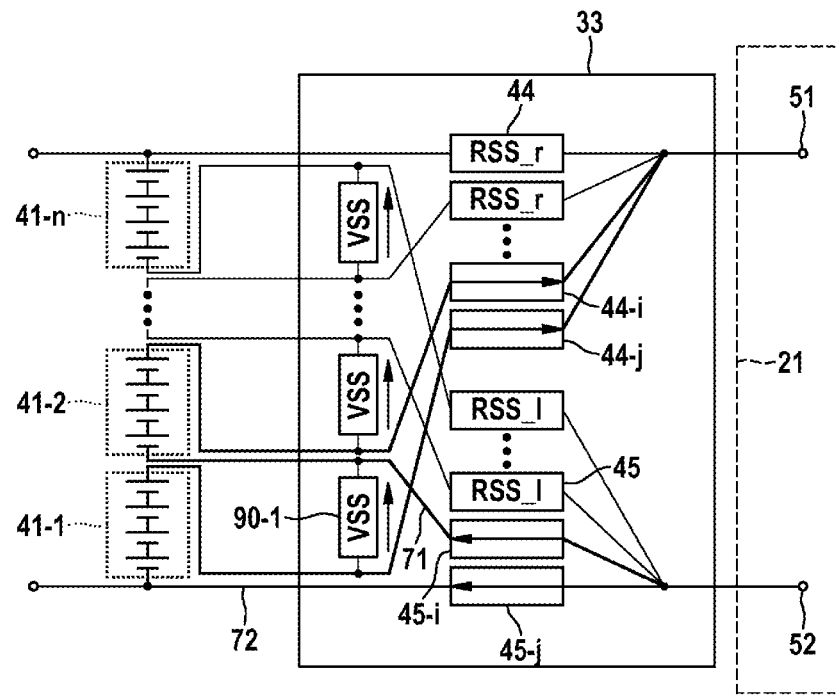
FIG. 7 shows the coupling unit from FIG. 5 in a further exemplary operating state and FIG. 8 shows the switches with reverse and forward blocking capability.

FIG. 7 shows the supply of power to the low voltage subsystem 21 by way of example from the battery units 41-1, 41-2 via the switches with reverse blocking capability RSS_l 45-i, RSS_l 45-j, RSS_r 44-i, RSS_r 44-j that are switched on. A first current path 71 leads from the positive pole 52 via a switch with reverse blocking capability RSS_l 45-i, via the second connected battery unit 44-2 and via the further switch with reverse blocking capability RSS_r 44-i, to the negative pole 51. Furthermore, a further current path 72 leads from the positive pole 52 via the switch with reverse blocking capability RSS_l 45-j, via the first connected battery unit 41-1, via the further switch with reverse blocking capability RSS_r 44-j, to the negative pole 51. When the switch 90-1 is open, the first battery unit 41-1 and the second battery unit 41-2 are connected in parallel for the low voltage subsystem 21.

Figure 8:
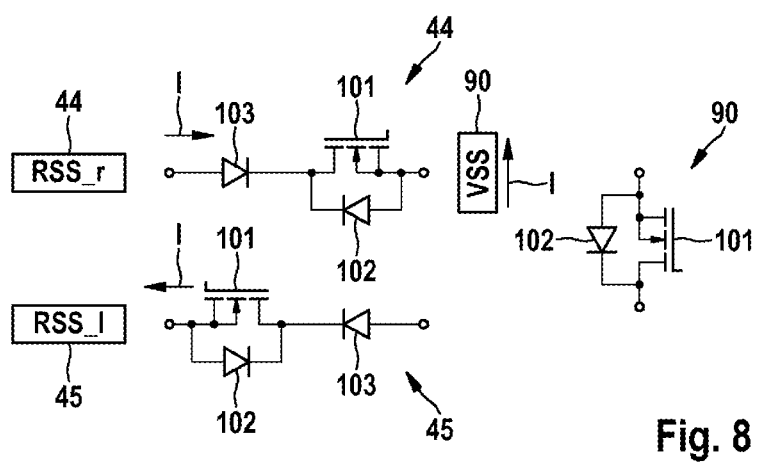

FIG. 8 shows a possible design for switches with reverse blocking capability 44, 45 and switches with forward blocking capability 90. In this case, the forward direction of the switches is indicated by 1. A switch with reverse blocking capability RSS_r 44 comprises an IGBT, MOSFET or bipolar transistor 101 and a diode 103 connected in series therewith, for example. FIG. 8 shows a MOSFET that has an intrinsic diode 102, which is also shown. The diode 103 connected in series with the MOSFET 101 is biased in the opposite direction to the intrinsic diode 102 of the MOSFET 101. The switch with reverse blocking capability RSS_r 44 allows the current to pass in the forward direction 1 and blocks in the opposite direction. The switch with reverse blocking capability RSS_l 45 corresponds to the RSS_r 44, is merely installed with the opposite polarity, so that the forward and reverse directions are interchanged. A switch with forward blocking capability 90 comprises a MOSFET, IGBT or bipolar transistor 101, the intrinsic diode 102 of which is also shown. The switches RSS_l 45, RSS_r 44 and VSS 90 are particularly also distinguished by a barely noticeable delay in the switching processes, i.e. allow a very short changeover period. A suitable actuating circuit can be used to set the time delay between the switches being switched off and switched on very accurately.

The disclosure is not limited to the exemplary embodiments described here and the aspects highlighted therein. Rather, a multiplicity of modifications that lie within the scope of action of a person skilled in the art are possible within the area specified by the disclosure.

The invention claimed is:

1. An onboard electrical system for a motor vehicle, the onboard electrical system comprising:
   a low voltage subsystem for at least one low voltage load configured to operate with a low voltage, the low voltage subsystem including an energy store configured to supply power to the at least one low voltage load;
   a high voltage subsystem for at least one high voltage load configured to operate with a high voltage, the high voltage subsystem having a battery configured to produce the high voltage and to output the high voltage to the high voltage subsystem, the battery having at least two battery units having individual voltage taps; and
   a coupling unit configured to connect the high voltage subsystem to the low voltage subsystem, the coupling unit configured to draw power from the battery of the high voltage subsystem and to supply the power to the energy store of the low voltage subsystem, the individual voltage taps of the at least two battery units routed to the coupling unit, the coupling unit further configured to selectively connect the at least two battery units to the energy store,
   wherein the coupling unit is further configured to receive a first voltage from the battery of the high voltage subsystem and to supply a second voltage different than the first voltage to the energy store of the low voltage subsystem.

2. The onboard electrical system as claimed in claim 1, wherein the at least two battery units are each configured to provide the low voltage.

3. The onboard electrical system as claimed in claim 1, wherein:
   the coupling unit includes a plurality of switches with reverse blocking capability that are each configurable in an "on" state and in an "off" state,
   when a switch of the plurality of switches is in the "on" state, a current flows through the switch only in one direction, and
   when the switch of the plurality of switches is in the "off" state, the switch accepts a blocking voltage having both polarities in order to prevent current flow through the switch.

4. The onboard electrical system as claimed in claim 1, wherein the coupling unit includes switches with forward blocking capability.

5. The onboard electrical system as claimed in claim 1, wherein the coupling unit is configured to connect the at least two battery units in parallel with one another for the low voltage subsystem.

6. The onboard electrical system as claimed in claim 1, wherein the coupling unit is configured to connect the at least two battery units in series to supply power to the at least one high voltage load.

7. The onboard electrical system as claimed in claim 1, wherein the energy store includes a capacitor.

8. The onboard electrical system as claimed in claim 1, further comprising:
   a controller configured to control the coupling unit to connect the battery units.

9. The onboard electrical system as claimed in claim 1, wherein the individual voltage taps are branched and supplied to a forward blocking switch.

10. The onboard electrical system as claimed in claim 1, wherein the coupling unit is configured to connect the at least two battery units in parallel using at least one forward blocking switch.

11. The onboard electrical system as claimed in claim 1, wherein:
   the coupling unit is configured to selectively connect the at least two battery units using the individual voltage taps; and
   the individual voltage taps are branched and supplied to a forward blocking switch.

12. The onboard electrical system as claimed in claim 1, wherein the coupling unit is further configured to receive the first voltage from the battery of the high voltage subsystem and supply the second voltage lower than the first voltage to the energy store of the low voltage subsystem.

13. An onboard electrical system for a motor vehicle, the onboard electrical system comprising:
   a low voltage subsystem for at least one low voltage load configured to operate with a low voltage, the low voltage subsystem including an energy store configured to supply power to the at least one low voltage load;
   a high voltage subsystem for at least one high voltage load configured to operate with a high voltage, the high voltage subsystem having a battery configured to produce the high voltage and to output the high voltage to the high voltage subsystem, the battery having at least two battery units having individual voltage taps; and
   a coupling unit configured to connect the high voltage subsystem to the low voltage subsystem, the coupling unit configured to draw power from the battery of the high voltage subsystem and to supply the power to the energy store of the low voltage subsystem, the individual voltage taps of the at least two battery units routed to the coupling unit, the coupling unit further configured to selectively connect the at least two battery units to the energy store,
   wherein the coupling unit is configured to connect the at least two battery units in parallel using at least one forward blocking switch, and
   wherein at least one reverse blocking switch prevents flow of the power from a first battery unit of the at least two battery units having a higher voltage level to a second battery unit of the at least two battery units having a lower voltage level.

14. An onboard electrical system for a motor vehicle, the onboard electrical system comprising:
a low voltage subsystem for at least one low voltage load configured to operate with a low voltage, the low voltage subsystem including an energy store configured to supply power to the at least one low voltage load;
a high voltage subsystem for at least one high voltage load configured to operate with a high voltage, the high voltage subsystem having a battery configured to produce the high voltage and to output the high voltage to the high voltage subsystem, the battery having at least two battery units having individual voltage taps; and
a coupling unit configured to connect the high voltage subsystem to the low voltage subsystem, the coupling unit configured to draw power from the battery of the high voltage subsystem and to supply the power to the energy store of the low voltage subsystem, the individual voltage taps of the at least two battery units routed to the coupling unit, the coupling unit further configured to selectively connect the at least two battery units to the energy store,
wherein the coupling unit is configured to connect the at least two battery units in parallel using at least one forward blocking switch, and
wherein the at least one forward blocking switch is off and a generator supplies no power to the high voltage subsystem when the at least two battery units are connected in parallel.

* * * * *